(12) United States Patent
Saito et al.

(10) Patent No.: US 10,965,135 B2
(45) Date of Patent: Mar. 30, 2021

(54) CHARGE/DISCHARGE CONTROL CIRCUIT AND BATTERY DEVICE

(71) Applicant: ABLIC Inc., Chiba (JP)

(72) Inventors: Hiroshi Saito, Chiba (JP); Fumihiko Maetani, Chiba (JP); Akihiko Suzuki, Hamamatsu (JP); Takahiro Kuratomi, Hamamatsu (JP)

(73) Assignee: ABLIC INC., Chiba (JP)

( * ) Notice: Subject to any disclaimer, the term of this patent is extended or adjusted under 35 U.S.C. 154(b) by 393 days.

(21) Appl. No.: 15/894,441

(22) Filed: Feb. 12, 2018

(65) Prior Publication Data

US 2018/0262035 A1  Sep. 13, 2018

(30) Foreign Application Priority Data

Mar. 13, 2017 (JP) .............................. JP2017-047523

(51) Int. Cl.
*H02J 7/00* (2006.01)

(52) U.S. Cl.
CPC .......... *H02J 7/0068* (2013.01); *H02J 7/0029* (2013.01); *H02J 7/0031* (2013.01); *H02J 7/0047* (2013.01); *H02J 7/0072* (2013.01); *H02J 7/0048* (2020.01); *H02J 7/00306* (2020.01)

(58) Field of Classification Search
CPC .................................................... H02J 7/0068
USPC ....................................................... 320/128
See application file for complete search history.

(56) References Cited

U.S. PATENT DOCUMENTS

| 5,530,336 | A | * | 6/1996 | Eguchi | ................... | H02J 7/0013 |
| | | | | | | 320/118 |
| 6,060,863 | A | * | 5/2000 | Sakurai | ................... | H02J 7/0031 |
| | | | | | | 320/136 |
| 6,501,248 | B2 | * | 12/2002 | Fujiwara | ............... | H02J 7/0031 |
| | | | | | | 320/136 |
| 2001/0052759 | A1 | * | 12/2001 | Sakurai | ................. | H02J 7/0031 |
| | | | | | | 320/134 |
| 2003/0141847 | A1 | * | 7/2003 | Fujiwara | ............... | H02J 7/0031 |
| | | | | | | 320/134 |
| 2004/0189259 | A1 | * | 9/2004 | Miura | ................... | H02J 7/0031 |
| | | | | | | 320/134 |
| 2005/0077878 | A1 | * | 4/2005 | Carrier | ...................... | B25F 5/00 |
| | | | | | | 320/134 |

(Continued)

FOREIGN PATENT DOCUMENTS

JP          10-313542 A    * 11/1998
JP          3190597 B2      7/2001

(Continued)

*Primary Examiner* — Yalkew Fantu
(74) *Attorney, Agent, or Firm* — Brinks Gilson & Lione

(57) ABSTRACT

A charge/discharge control circuit includes: a first power supply terminal connected to a first electrode of a secondary battery; a second power supply terminal connected to a second electrode of the secondary battery; a control circuit configured to control charge/discharge of the secondary battery; and a power-down release pulse generation circuit connected to the power-down release terminal, the power-down release pulse generation circuit being configured to supply, in a power-down state of the charge/discharge control circuit, a power-down release pulse at least to the control circuit in response to an input of a power-down release signal to the power-down release terminal to release the power-down state.

5 Claims, 3 Drawing Sheets

(56) References Cited

U.S. PATENT DOCUMENTS

2008/0048620 A1    2/2008  Zhang
2012/0229945 A1*   9/2012  Sakurai ................ H02J 7/0031
                                                              361/86

FOREIGN PATENT DOCUMENTS

JP    2013-247741 A    12/2013
JP    2014-018038 A     1/2014
TW         I399008 B    6/2013

* cited by examiner

CHARGE/DISCHARGE CONTROL CIRCUIT AND BATTERY DEVICE

RELATED APPLICATIONS

This application claims priority under 35 U.S.C. § 119 to Japanese Patent Application No. 2017-047523 filed on Mar. 13, 2017, the entire content of which is hereby incorporated by reference.

BACKGROUND OF THE INVENTION

1. Field of the Invention

The present invention relates to a charge/discharge control circuit and a battery device.

2. Description of the Related Art

Hitherto, there has been known a battery device including a charge/discharge control circuit, a secondary battery, a charge/discharge path connected to the secondary battery, and a charge control transistor and a discharge control transistor that are arranged in the charge/discharge path (see, for example, Japanese Patent No. 3190597).

In the battery device described in Japanese Patent No. 3190597, when a voltage of the secondary battery falls below an overdischarge voltage, the charge/discharge control circuit turns off the discharge control transistor, and brings the battery device into an overdischarge state in which a discharge current from the secondary battery to a load is stopped. In the overdischarge state, when a battery charger is not connected to external terminals of the battery device, the battery device enters a power-down state in which operation of a predetermined circuit of the charge/discharge control circuit is stopped to reduce power consumption.

Incidentally, in the battery device described in Japanese Patent No. 3190597, for example, even when overdischarge of the secondary battery is detected, the discharge control transistor is turned off, and thus the battery device enters the power-down state, there is a case in which voltage drop due to internal impedance of the secondary battery disappears, and the voltage of the secondary battery is restored, permitting the battery device to enter a state in which current can be supplied from the secondary battery to the load.

In the battery device described in Japanese Patent No. 3190597, however, it is required to connect the battery charger to the external terminals in order to release the power-down state.

In short, in the battery device described in Japanese Patent No. 3190597, even when the battery device is in a state in which current can be supplied from the secondary battery to the load after the battery device has entered the power-down state, a user cannot release the power-down state unless the user connects the battery charger to the external terminals to utilize a discharge current from the secondary battery.

SUMMARY OF THE INVENTION

It is an object of the present invention to provide a charge/discharge control circuit in which a power-down state can be released without connecting a battery charger to an external terminal, to thereby enable a load to be supplied with current, and a battery device.

One embodiment of the present invention is a charge/discharge control circuit, including: a first power supply terminal connected to a first electrode of a secondary battery; a second power supply terminal connected to a second electrode of the secondary battery; a power-down release terminal; a control circuit configured to control charge/discharge of the secondary battery; and a power-down release pulse generation circuit connected to the power-down release terminal, in which the power-down release pulse generation circuit is configured to supply, in a power-down state of the charge/discharge control circuit, a power-down release pulse at least to the control circuit in response to an input of a power-down release signal to the power-down release terminal to release the power-down state.

Further, one embodiment of the present invention is a battery device, including: the charge/discharge control circuit; the secondary battery; a charge/discharge path connected to the secondary battery; and a charge control transistor and a discharge control transistor which are arranged in the charge/discharge path.

According to the present invention, with the charge/discharge control circuit configured as described above, in the power-down state of the charge/discharge control circuit, the power-down state can be released by an input of the power-down release signal to the power-down release terminal. Consequently, it is possible to supply current to the load from the secondary battery without connecting the battery charger to the external terminals when a voltage of the secondary battery is restored after the charge/discharge control circuit enters an overdischarge state and then the power-down state.

DETAILED DESCRIPTION OF THE EMBODIMENTS

First Embodiment

Figure 1:
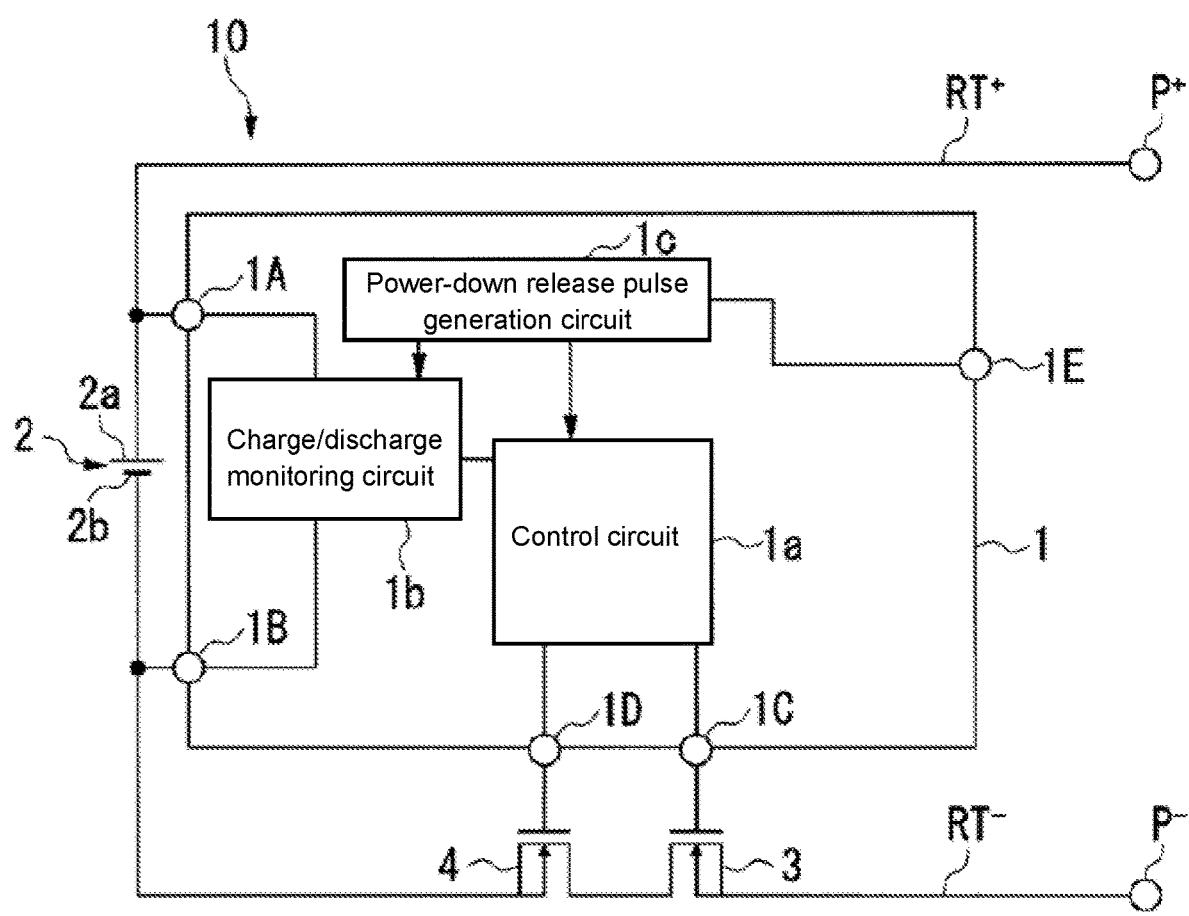
FIG. 1 is a diagram for illustrating an example of a battery device including a charge/discharge control circuit according to a first embodiment of the present invention.

Now, a charge/discharge control circuit 1 according to a first embodiment of the present invention is described with reference to the drawing.

FIG. 1 is a diagram for illustrating an example of a battery device 10 including the charge/discharge control circuit 1 according to the first embodiment.

In the example illustrated in FIG. 1, the battery device 10 includes the charge/discharge control circuit 1, a secondary battery 2, charge/discharge paths RT+ and RT−, external terminals P+ and P−, a charge control transistor 3, and a discharge control transistor 4. The charge control transistor 3 is configured to control charge to the secondary battery 2. The discharge control transistor 4 is configured to control discharge from the secondary battery 2.

The charge/discharge path RT+ is connected to a first electrode 2a of the secondary battery 2. The external terminal P+ is provided in the charge/discharge path RT+. The charge/discharge path RT− is connected to a second electrode 2b of the secondary battery 2. The external terminal P− is provided in the charge/discharge path RT−. The charge control transistor 3 and the discharge control transistor 4 are arranged in the charge/discharge path RT−. Specifically, a source terminal of the charge control transistor 3 is connected to the external terminal P−. A drain terminal of the charge control transistor 3 is connected to a drain terminal of the discharge control transistor 4. A source terminal of the discharge control transistor 4 is connected to the second electrode 2b of the secondary battery 2.

In the example illustrated in FIG. 1, the charge/discharge control circuit 1 includes a first power supply terminal 1A, a second power supply terminal 1B, a charge control terminal 1C, a discharge control terminal 1D, a power-down release terminal 1E, a control circuit 1a, a charge/discharge monitoring circuit 1b, and a power-down release pulse generation circuit 1c. The control circuit 1a is configured to control the charge control transistor 3 and the discharge control transistor 4. The charge/discharge monitoring circuit 1b is configured to monitor a charge/discharge state of the secondary battery 2. The power-down release pulse generation circuit 1c is configured to generate a power-down release pulse.

The first power supply terminal 1A is connected to the first electrode 2a of the secondary battery 2. Further, the first power supply terminal 1A is connected to the charge/discharge monitoring circuit 1b. The second power supply terminal 1B is connected to the second electrode 2b of the secondary battery 2. Further, the second power supply terminal 1B is connected to the charge/discharge monitoring circuit 1b. The charge/discharge monitoring circuit 1b is connected to the control circuit 1a and the power-down release pulse generation circuit 1c.

The charge control terminal 1C is connected to a gate terminal of the charge control transistor 3. Further, the charge control terminal 1C is connected to the control circuit 1a. The discharge control terminal 1D is connected to a gate terminal of the discharge control transistor 4. Further, the discharge control terminal 1D is connected to the control circuit 1a. The control circuit 1a is connected to the power-down release pulse generation circuit 1c. The power-down release terminal 1E is connected to the power-down release pulse generation circuit 1c.

A battery voltage of the secondary battery 2 is used not only for a power supply in the charge/discharge monitoring circuit 1b connected to the first power supply terminal 1A and the second power supply terminal 1B, but also for a power supply in the control circuit 1a, the power-down release pulse generation circuit 1c, and other circuit blocks (not shown) in the charge/discharge control circuit 1.

In the example illustrated in FIG. 1, a power-down release signal is input to the power-down release terminal 1E, and the power-down release pulse generation circuit 1c generates the power-down release pulse in response to a change of the state of the power-down release signal, for example, a fall. The generated power-down release pulse is supplied to the control circuit 1a and the charge/discharge monitoring circuit 1b.

<Overdischarge State>

In the example illustrated in FIG. 1, the charge/discharge monitoring circuit 1b is configured to detect overdischarge of the secondary battery 2 based on a voltage at the first electrode 2a of the secondary battery 2 which is input through the first power supply terminal 1A, and a voltage at the second electrode 2b of the secondary battery 2 which is input through the second power supply terminal 1B.

When the overdischarge of the secondary battery 2 in which the voltage of the secondary battery 2 falls below an overdischarge voltage is detected by the charge/discharge monitoring circuit 1b, the control circuit 1a outputs, based on a discharge prohibition signal from the charge/discharge monitoring circuit 1b, a control signal for turning off the discharge control transistor 4 to the gate terminal thereof via the discharge control terminal 1D thereby entering an overdischarge state.

<Power-Down State of Charge/Discharge Control Circuit 1>

In the overdischarge state the charge/discharge control circuit 1 enters a power-down state in which operation of the charge/discharge monitoring circuit 1b and other predetermined circuits (not shown) in the charge/discharge control circuit 1 stop to reduce power consumption when a battery charger (not shown) is not connected to the external terminals P+ and P−.

In the power-down state of the charge/discharge control circuit 1, the control circuit 1a may turn off the charge control transistor 3.

<Release from Power-Down State of Charge/Discharge Control Circuit 1>

In the example illustrated in FIG. 1, when the power-down release signal is input to the power-down release terminal 1E, the power-down release pulse generation circuit 1c generates a power-down release pulse. The power-down release pulse is a one-shot pulse.

For example, the power-down release signal is input to the power-down release terminal 1E when a user of the battery device 10 presses a button or the like connected to the power-down release terminal 1E.

The power-down release pulse generated by the power-down release pulse generation circuit 1c is input to the control circuit 1a and the charge/discharge monitoring circuit 1b. The control circuit 1a outputs, based on the input power-down release pulse, a control signal to turn on the discharge control transistor 4 and a control signal (not shown) to resume operation of the stopped predetermined circuits (not shown) in the charge/discharge control circuit 1.

The charge/discharge monitoring circuit 1b also resumes operation thereof based on the input power-down release pulse.

The power-down state of the charge/discharge control circuit 1 is thus released.

As described above, according to the first embodiment, without connecting the battery charger between the external terminal P+ and the external terminal P−, the user can release the power-down state by inputting the power-down release signal to the power-down release terminal 1E, and supply current from the secondary battery 2 to the load when the voltage of the secondary battery 2 is restored after the charge/discharge control circuit 1 enters the power-down state.

Consequently a time period for supplying current from the secondary battery 2 to the load might be extended even when the user does not have the battery charger.

<Period of Power-Down Release Pulse>

In the example illustrated in FIG. 1, as described above, when the charge/discharge control circuit 1 is in the power-down state, once the power-down release signal is input to the power-down release terminal 1E, the power-down release pulse generated by the power-down release pulse generation circuit 1c is input to the control circuit 1a to turn on the discharge control transistor 4.

Assuming that the power-down release pulse is not a pulse but, for example, a signal maintaining a high level, the discharge control transistor 4 is kept in an ON state during a period in which the high level of the signal is kept, with the result that the charge/discharge control circuit 1 does not operate normally.

In view of the foregoing, in the example illustrated in FIG. 1, the power-down release pulse generation circuit 1c is configured to generate a pulse, preventing the charge/discharge control circuit 1 according to the first embodiment from operating non-normally.

In the example illustrated in FIG. 1, the power-down release pulse generated by the power-down release pulse generation circuit 1c is input to the control circuit 1a and the charge/discharge monitoring circuit 1b. In another example, the power-down release pulse may be input only to the control circuit 1a, and the control circuit 1a may output a control signal for resuming operation of the charge/discharge monitoring circuit 1b to the charge/discharge monitoring circuit 1b.

Second Embodiment

A battery device 10 including a charge/discharge control circuit 1 according to a second embodiment of the present invention is configured similarly to the above-mentioned battery device 10 including the charge/discharge control circuit 1 according to the first embodiment except for points described later. Consequently, according to the battery device 10 including the charge/discharge control circuit 1 according to the second embodiment, the same effect as that of the battery device 10 including the charge/discharge control circuit 1 according to the first embodiment may be exhibited.

Figure 2:
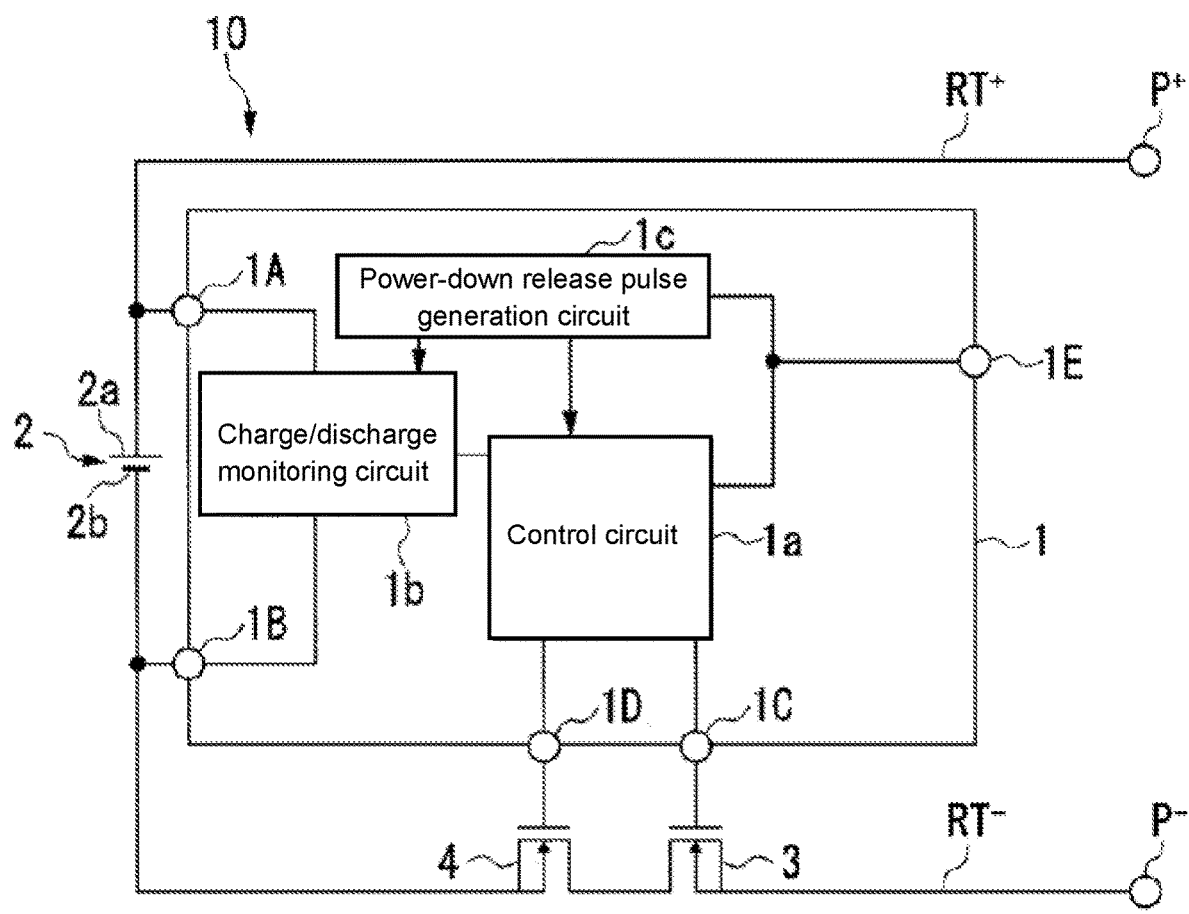
FIG. 2 is a diagram for illustrating an example of a battery device including a charge/discharge control circuit according to a second embodiment of the present invention.

FIG. 2 is a diagram for illustrating an example of the battery device 10 including the charge/discharge control circuit 1 according to the second embodiment.

In the example illustrated in FIG. 1, the power-down release terminal 1E is not directly connected to the control circuit 1a, but is connected via the power-down release pulse generation circuit 1c.

In contrast, in the example illustrated in FIG. 2, the power-down release terminal 1E is directly connected to the control circuit 1a. Further, the charge/discharge control circuit 1 has a function of entering into a power-down state based on a forced power-down signal from an outside under a normal state in which no overdischarge of the secondary battery 2 is detected. This is a function which is particularly employed at the time of the shipment of the battery device 10 for reducing power consumption during a period from shipment until the battery device 10 is actually used.

<Forced Power-Down>

In the example illustrated in FIG. 2, the power-down release terminal 1E is also used as a forced power-down terminal to which a forced power-down signal is input.

Specifically, when, for example, a signal maintaining a high level is input to the forced power-down terminal (power-down release terminal) 1E as the forced power-down signal, the forced power-down signal is input to the control circuit 1a and the power-down release pulse generation circuit 1c.

In a case where the power-down release pulse generation circuit 1c generates the power-down release pulse in response to a fall of the power-down release signal as described above, even when the forced power-down signal maintaining a high level is input to the power-down release pulse generation circuit 1c, the power-down release pulse generation circuit 1c does not generate the power-down release pulse because there is no fall of the input signal.

In contrast, when the forced power-down signal is input, the control circuit 1a stops operation of the charge/discharge monitoring circuit 1b and the predetermined circuits (not shown) in the charge/discharge control circuit 1 based on the input forced power-down signal. As a result, the charge/discharge control circuit 1 enters the power-down state in which power consumption is reduced.

As described above, in the example illustrated in FIG. 2, the terminal 1E is used both as the power-down release terminal to which the power-down release signal for releasing the power-down state of the charge/discharge control circuit 1 is input, and as the forced power-down terminal to which the forced power-down signal for forcedly turn the charge/discharge control circuit 1 into the power-down state. Accordingly, since it is not required to separately provide the power-down release terminal and the forced power-down terminal, it is possible to suppress increase in number of terminals of the charge/discharge control circuit 1, thereby being capable of downsizing the charge/discharge control circuit 1.

<Release from Forced Power-Down State of Charge/Discharge Control Circuit 1>

In the example illustrated in FIG. 2, during a period in which the forced power-down signal which is input to the forced power-down terminal (power-down release terminal) 1E maintains a high level, the charge/discharge control circuit 1 maintains the power-down state.

Then, for example, the power charger is connected to the external terminals P+ and P−, the forced power-down signal falls from the high level to a low level. In response to this fall, the power-down release pulse generation circuit 1c generates the power-down release pulse. With this, a forced power-down state of the charge/discharge control circuit 1 is released.

Third Embodiment

A battery device 10 including a charge/discharge control circuit 1 according to a third embodiment of the present invention is configured similarly to the above-mentioned battery device 10 including the charge/discharge control circuit 1 according to the first embodiment except for points described later. Consequently, according to the battery device 10 including the charge/discharge control circuit 1 according to the third embodiment, the same effect as that of the battery device 10 including the charge/discharge control circuit 1 according to the first embodiment may be exhibited.

Figure 3:
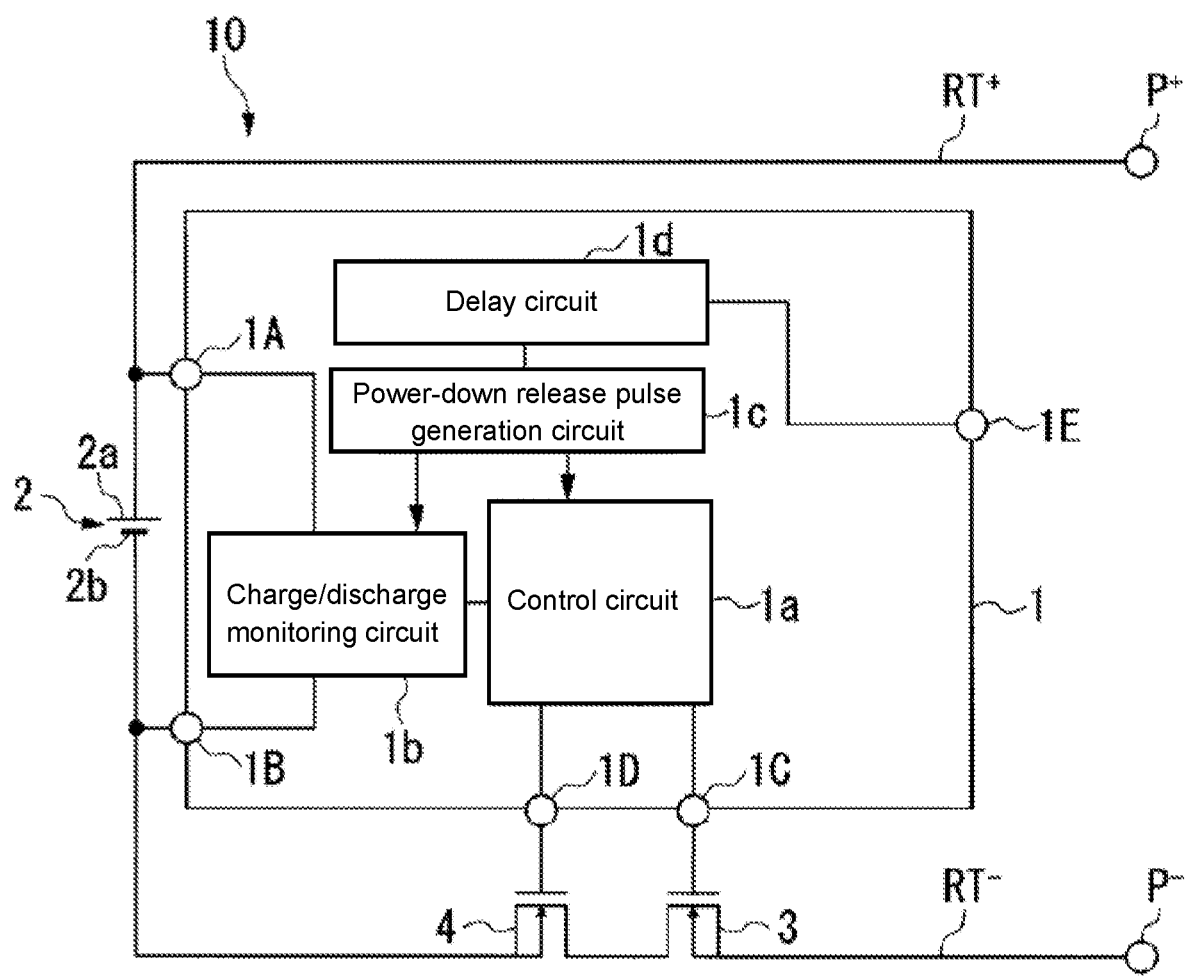
FIG. 3 is a diagram for illustrating an example of a battery device including a charge/discharge control circuit according to a third embodiment of the present invention.

FIG. 3 is a diagram for illustrating an example of the battery device 10 including the charge/discharge control circuit 1 according to the third embodiment.

In the example illustrated in FIG. 1, the power-down release terminal 1E is directly connected to the power-down release pulse generation circuit 1c. However, in the example illustrated in FIG. 3, a delay circuit 1d is arranged between the power-down release terminal 1E and the power-down release pulse generation circuit 1c.

In the example illustrated in FIG. 1, when the power-down release signal is input to the power-down release terminal 1E, the power-down release signal is input to the power-down release pulse generation circuit 1c without having a delay time.

In contrast, in the example illustrated in FIG. 3, when the power-down release signal is input to the power-down release terminal 1E, the power-down release signal is output from the delay circuit 1d after elapse of a predetermined delay time and input to the power-down release pulse generation circuit 1c.

For that reason, in the charge/discharge control circuit 1 according to the third embodiment, it is possible to improve resistance to noise that is input to the power-down release terminal 1E more than in a case where the delay circuit 1*d* is not provided, that is, the power-down release signal is input to the power-down release pulse generation circuit 1*c* without having a delay time. As a result, the charge/discharge control circuit 1 according to the third embodiment can prevent malfunction due to the noise.

In an example of the battery device 10 including the charge/discharge control circuit 1 according to the third embodiment, the delay circuit 1*d* is configured with use of a capacitor and a resistor (CR). In another example of the battery device 10, the delay time may be counted with use of an oscillator circuit instead of the CR.

Embodiments and variations of the present invention have been described. However, those embodiments and variations are presented as examples and are not intended to limit the scope of the invention. Those embodiments may be implemented in other various modes, and various kinds of omissions, replacements, and modifications can be made without departing from the gist of the invention. Those embodiments and variations thereof are included in the scopes of the invention described in the appended claims and their equivalents in the same way as those are included in the scope and gist of the invention. Further, the above-mentioned embodiments and variations thereof can be combined as appropriate.

What is claimed is:

1. A charge/discharge control circuit, comprising:
   a first power supply terminal connected to a first electrode of a secondary battery;
   a second power supply terminal connected to a second electrode of the secondary battery;
   a power-down release terminal;
   a control circuit configured to control charge/discharge of the secondary battery; and
   a power-down release pulse generation circuit connected to the power-down release terminal,
   wherein the power-down release pulse generation circuit is configured to, while the charge/discharge control circuit is in a power-down state:
      receive an input of a power-down release signal on the power-down release terminal, the power-down release signal to release the power-down state of the charge/discharge control circuit; and
      supply a power-down release pulse at least to the control circuit in response to receiving the power-down release signal; and
   wherein the control circuit is configured to turn on a discharge control transistor to supply current from the secondary battery to a load in response to receiving the power-down release pulse.

2. The charge/discharge control circuit according to claim 1, further comprising a forced power-down terminal to which a forced power-down signal is input,
   wherein the forced power-down terminal is also used as the power-down release terminal.

3. The charge/discharge control circuit according to claim 1, further comprising a delay circuit between the power-down release terminal and the power-down release pulse generation circuit, the delay circuit being configured to delay the power-down release signal for a predetermined period of time.

4. The charge/discharge control circuit according to claim 2, further comprising a delay circuit between the power-down release terminal and the power-down release pulse generation circuit, the delay circuit being configured to delay the power-down release signal for a predetermined period of time.

5. A battery device, comprising:
   the charge/discharge control circuit of claim 1;
   the secondary battery;
   a charge/discharge path connected to the secondary battery; and
   a charge control transistor and the discharge control transistor arranged in the charge/discharge path.

* * * * *